Feb. 10, 1948.    G. L. USSELMAN    2,435,808
WAVE LENGTH MODULATION
Filed Feb. 21, 1944

INVENTOR.
GEORGE L. USSELMAN.
BY
*H. G. Grover*
ATTORNEY

Patented Feb. 10, 1948

2,435,808

UNITED STATES PATENT OFFICE 2,435,808

WAVE LENGTH MODULATION

George L. Usselman, Port Jefferson, N. Y., assignor to Radio Corporation of America, a corporation of Delaware Application February 21, 1944, Serial No. 523,231

10 Claims. (Cl. 179—171.5)

In this application I disclose an improved wave generating and wave length modulation arrangement. The arrangement is of the type where oscillations are generated in a tube and as generated are modulated as to their wave length.

An object of my invention is improved wave generation and wave length modulation.

A further object of my invention is a simplified and inexpensive wave generator and wave length modulator.

An additional object of my invention is a wave generator and a wave length modulator, as described in the preceding paragraph, by means of which considerable wave length modulation in accordance with signals may be obtained without entailing undue undesired amplitude modulation of the wave energy.

Figure 1:
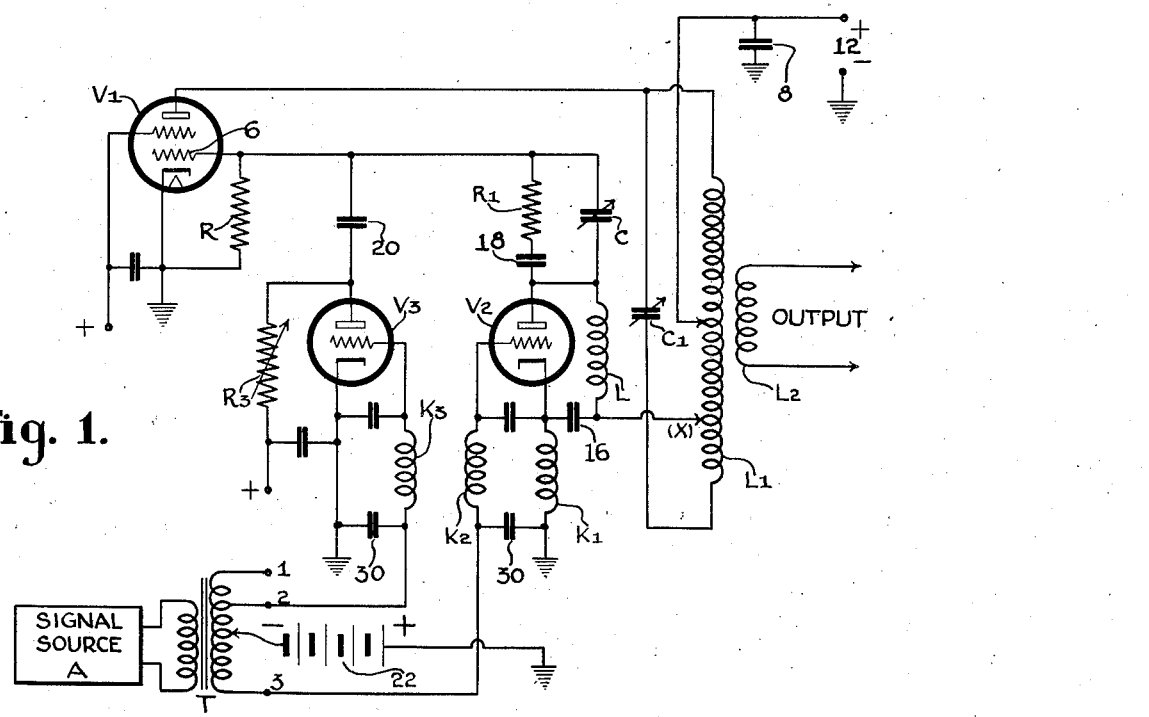
Figure 2:
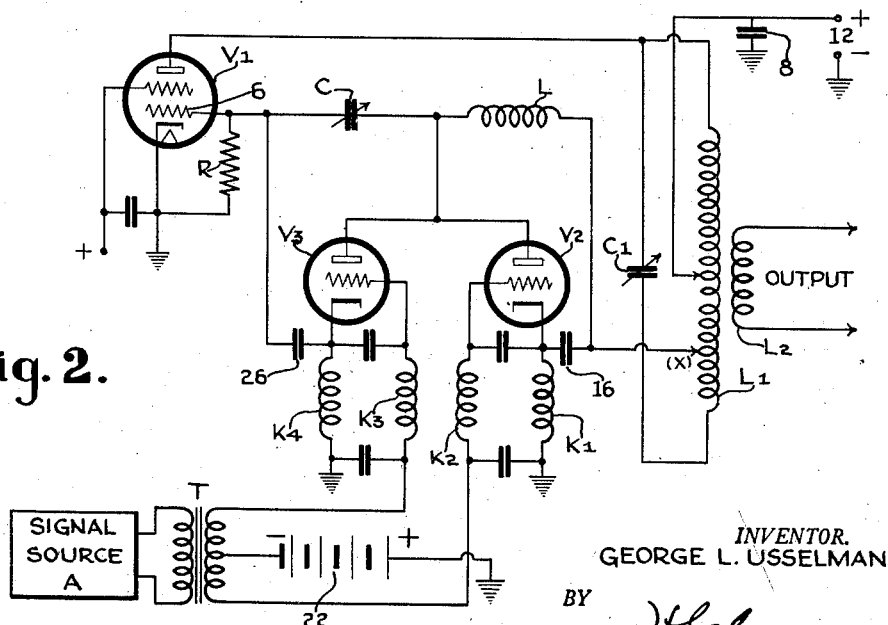

The manner in which the above objects and others are attained will appear in the detailed description which follows and therefrom when read with the attached drawings, wherein Figs. 1 and 2 are schematic circuit diagrams showing the essential features of two systems arranged in accordance with my invention.

In the embodiment of Fig. 1, a single tube generator is arranged to be modulated in a novel manner by a single tube modulator. In this embodiment an additional tube provides for compensating or reducing undesired amplitude modulation entailed by the wave length modulation process. In the embodiment of Fig. 2, the single wave generator is modulated by a pair of modulator tubes which act in a complementary manner to extend the range of wave length modulation and to also reduce or compensate any undesired amplitude modulation produced during the operation.

In Fig. 1 of the drawings, the tube VI is shown as a two-grid tube, but may be of any appropriate type, and has its anode and control grid 6 regeneratively coupled by a tank circuit including CILI. The anode is coupled as shown to one end of the tank circuit. The cathode is coupled to a point on the tank circuit by bypassing condenser 8, while the grid 6 is coupled to a point on inductance L of a potential opposite to the potential at the anode end of the tank circuit. This grid coupling includes an inductance L and a condenser C, and disregarding for the time being the modulating connections, etc., the tube VI when its electrodes are properly energized by the grid leak biasing resistor R and direct current supplied to the anode from the source 12 as shown, generates oscillations of a frequency determined primarily by the values of CI and LI.

The modulator tube V2 has its cathode connected to ground by radio frequency impedance KI and also connected to a point on the inductance L by a coupling and direct current blocking condenser 16. The anode of this tube is connected to a point on L spaced from said first point and by direct current blocking and coupling condenser 18 and resistor RI to the grid 6, the arrangement being such that RI shunts condenser C while the impedance of tube V2 shunts inductance L. L also supplies plate potential to the tube V2.

The second tube V3, referred to herein as the amplitude modulation compensating tube has its anode coupled by coupling and direct current blocking condenser 20 to the grid 6, and its cathode connected to ground. R3 supplies the direct current to the anode of tube V3. The control grids of the tube V2 and V3 are coupled differentially to the secondary winding of a transformer T, a point of which is connected to ground by a negative grid bias supply source 22. Note that the connection between the grid of V3 and the secondary winding of transformer T is adjustable by a tap which may be put on contacts 1 or 2. The primary winding of source T is coupled to the signal source. Inductances K2 and K3, similar to inductance KI, are included in the leads to the grids of tube V2 and V3. R. F. bypassing condensers 30 shunt the two sides of the secondary winding of transformer T to keep R. F. out of the modulation circuits.

More or less standard symbols are used in the drawings to facilitate understanding of the invention.

One of the essential parts of this frequency modulator is the oscillator circuit, described briefly above. The anode of tube VI is connected as shown in Fig. 1, to one end of tank circuit CILI. The central part of the tank inductance LI is grounded for radio frequency by the radio frequency bypassing and blocking condenser 8. The excitation for the control grid of oscillator tube VI is obtained from the lower part of CILI, i. e., the end opposite the end to which the anode is connected. This excitation energy passes through phase retarding element L shunted by tube V2 and through phase advancing element C shunted by resistor RI. The anode and grid are at substantially opposed R. F. and oscillations are generated. A grid resistor R supplies negative bias for the control grid of tube VI by grid leak action.

The values of condenser C and inductance L may be chosen so that their reactances cancel at the generated frequency which may be considered the carrier frequency. The internal resistance of tube V2 and the resistance of resistor R1 also are then about equal. Both the audio excitation and the filament heater power for tube V2 pass through half wave chokes K2 and K1 to prevent grounding the radio frequency excitation circuit. The cathode of tube V2 is coupled at radio frequency by condenser 16 to the tank circuit end of inductance L and the anode of tube V2 is substantially directly connected to the other end of inductance L which is also connected to condenser C. In other words, the tube V2 shunts inductance L. The resistor R1 shunts condenser C through series blocking condenser 18. The resistance of resistor R1 is made such that it equals the radio frequency resistance of tube V2 when unmodulated current flows therein in V2. The blocking condenser 18 blocks the direct current tank current from the control grid of tube V1.

For operation of the circuit shown in Fig. 1, assume that proper steady voltages have been applied and that the circuit is oscillating at the carrier frequency. When no signals are present the carrier output energy is unmodulated. But when signals are generated in source A they pass through transformer T to the grid of tube V2. This varies the grid bias and the anode current in tube V2 in accordance with the signal modulations and consequently varies the tube resistance shunted across phase shifting element L. As stated before, when no modulation is present the impedance of R1 and C balances the impedance of V2 and L. However, when tube V2 is modulated this combination is thrown out of balance so that the phase of the excitation reaching the grid of tube V1 is advanced and retarded in accordance with the signal current variations. Since the modulator circuit is also an oscillator the output carrier energy is frequently modulated according to the signal frequency and amplitude.

Now with the circuit described so far, there will be some amplitude modulation present in the carrier output when signal oscillations are applied. In order to balance out this amplitude modulation, I couple the anode of a tube V3 to the grid of tube V1 through blocking condenser 20. The cathode of V3 is grounded directly. Anode current for tube V3 is supplied through a choke coil or a variable resistor R3. The bias and modulation for the grid of tube V3 is fed through balancing R. F. choke coil K3. Then the lead from the grid of tube V3 is connected to the second tap on transformer T, the grid of tube V2 being connected to the third tap of transformer T. Bias source 22 and ground G may be tapped at a desirable point between taps 1 and 3 on transformer T. Now bias source 22 may be adjusted to maintain the proper amount of grid bias to give the desired amount of steady anode current in tube V2. In order to balance out the amplitude modulation from the modulator output, resistor R3 may be varied to obtain the desired anode current in tube V3 and the position of the ground (bias) tap on transformer T may be set at a point so that tube V3 puts a certain required load on the grid of tube V1. When modulation is present the load presented by tube V3 on the grid of tube V1 is varied by the signal modulation in such a way as to absorb or take out any amplitude modulation introduced by tube V2. In other words, if the amplitude of the excitation energy to the grid of tube V1 is caused to rise and fall by tube V2 during the process of modulation the load of the tube V3 on V1 also falls and rises in such a way as to hold a constant amplitude of excitation on the grid of V1 as its phase and frequency is being modulated, so that only frequency modulation is present in the output carrier oscillation.

Fig. 2 shows a preferred arrangement of this frequency modulator in which the amplitude modulation is balanced out of the frequency modulated carrier by the use of two modulator tubes operated in pushpull relation. Tube V2 internal impedance is connected so as to shunt the radio frequency current of phase retarding element L and tube V3 internal impedance is connected so as to shunt the radio frequency current of phase advancing element C. The anodes of tubes V2 and V3 are connected to the junction of elements L and C. Blocking condensers 16 and 26 complete the shunt circuit of V2 and V3 across elements L and C. Both tubes V2 and V3 are provided with, in their cathode to ground connections, half wave length choke coils K1—K2—K3—K4 to prevent grounding the cathodes at the excitation energy. The grids of tubes V2 and V3 are modulated in pushpull relation from source A through transformer T. Otherwise, the circuit of Fig. 2 is similar to that of Fig. 1.

When signal modulation is present, if the direct current in tube V2 increases, there is a decrease of resistance, and if the current in tube V3 decreases, there is an increase in resistance. This causes an advance in the phase of the excitation of the grid 6 of tube V1. During the opposite part of the modulation cycle the current in tube V2 decreases, there is a resistance increase, the current in tube V3 increases, there is a resistance decrease, which causes the phase of the excitation of the grid 6 of tube V1 to be retarded. Since the current variation in tubes V2 and V3 are opposite the average load on the excitation circuit is constant and consequently amplitude modulation is balanced out of the frequency modulated carrier output energy. All of the foregoing relations and reasoning can be verified by the use of vectors. The desired amount of average current in tubes V2 and V3 may be obtained by adjustment of bias source 22. Anode current for tubes V2 and V3 is supplied through phase shifting coil L from the coil L1 of tank circuit C1L1. The output coil L2 is coupled to coil L1 of the tank circuit.

As stated before, shifting the phase of the excitation in this oscillator type of modulator causes a shift in the frequency because the change in excitation phase is added to each cycle. The frequency shift of the oscillator due to a certain excitation phase shift will continue to the point where detuning of the tank circuit C1L1 causes or introduces an opposite reactance resulting in a phase shift equal to and opposite to that caused by the modulating circuit. When modulation ceases the oscillations in tank circuit C1L1 will return to the frequency for which the tank circuit C1L1 is tuned which gives unity power factor.

In both modifications the connection between the end of inductance L and the point at inductance L1 may be broken and oscillatory energy from an external source applied by this connection to the inductance L. This converts the system into a phase modulator, since oscillatory energy of a frequency which is not variable by this modulator is supplied through L and C to the grid 6 and the phase of the oscillatory energy reaching the grid 6 is modulated as hereinbefore described. The output may be derived as shown by coupling to the tank circuit C1L1.

In the description given above, it is stated that the impedance of C is made equal to the impedance of L in the absence of modulation. In obtaining these dimensions for C and L the current through tube V2, that is, the external output impedance of this tube is considered in Fig. 1, and the internal output impedance of tubes V2 and V3 are considered in Fig. 2.

I claim:

1. In a timing modulation system, an electron discharge device having a cathode, a control grid and an anode coupled in a regenerative oscillation generating circuit, a capacitive reactance and an inductive reactance in series in said circuit in a coupling to an electrode of said device, an impedance in shunt to one reactance, a modulator tube having input and output electrodes, leads coupling the output electrodes of the modulator tube in shunt to the other of the reactances, to control the effective value thereof and as a consequence to control the phase of the generated oscillations on an electrode of said device, the arrangement being such that in the absence of modulation the current through the tube is such that the generated oscillations are of the desired carrier frequency, and means for modulating the current through the tube in accordance with signals.

2. In a timing modulation system, an electron discharge device having a control grid, a cathode and an anode with an output circuit connected to the anode, a regenerative circuit including two reactances of opposite sign in series coupling the electrodes in an oscillation generating circuit, a modulator tube having input and output electrodes, leads connecting the impedance between the output electrodes of the modulator tube in shunt to one of the reactances, an impedance in shunt to the other of the reactances, the arrangement being such that in the absence of modulation the current through the tube is such that the tube impedance and the other impedance are substantially equal to the impedances with which they are in shunt, and means for modulating the current through the tube in accordance with signals to upset said balance and modulate the timing of the oscillations generated.

3. In a timing modulation system, an electron discharge device having a control grid, a grounded cathode and an anode, a condenser and an inductance in a series circuit regeneratively coupling the control grid to the anode, a coupling between said circuit and ground, whereby oscillations are generated in said device when direct current operating potentials are applied to said electrodes, a modulator tube having input and output electrodes, leads connecting the impedance between the output electrodes of the modulator tube in shunt to the inductance, an impedance in shunt to the condenser, the arrangement being such that in the absence of modulation the current through the tube is such that the tube impedance and the other impedance substantially balance the impedances of the condenser and inductance, and the latter are substantially equal, and means for modulating the current through the tube in accordance with signals to upset said balance and modulate the timing of the oscillations generated.

4. In a timing modulation system, an oscillation generator including a tube having an anode, a cathode and a grid, with a tank circuit regeneratively coupled between the grid and the anode and to the cathode, a capacitive reactance and an inductive reactance in series in the coupling between the tank circuit and an electrode of the tube, an electron discharge device having input and output electrodes, connections coupling the output electrodes of said device in shunt to the capacitive reactance, and a source of modulating potentials coupled to electrodes of the device for modulating the current therethrough.

5. In a timing modulation system, an oscillation generator including a tube having an anode, a cathode and a grid, a tank circuit regeneratively coupled between the grid and the anode and to the cathode, a capacitive reactance and an inductive reactance in series in the coupling between the tank circuit and the grid of the tube, two electron discharge devices each having input and output electrodes, connections coupling the output electrodes of one device in shunt to one reactance, connections coupling the output electrodes of the other device to the grid and cathode of the tube, and a source of modulating potentials coupled to corresponding electrodes in the devices for differentially modulating the current therethrough.

6. In a timing modulation system, an oscillation generator including a tube having an anode, a cathode and a grid, with a tuned circuit having spaced points coupled to the grid and anode and an intermediate point coupled to the cathode, a capacitive reactance and an inductive reactance in series in the coupling between said point on the tuned circuit and the control grid of the tube, two electron discharge devices each having input and output electrodes, connections coupling the output electrodes of one device in shunt to one reactance, connections coupling the output electrodes of the other device in shunt to the other reactance, and a source of modulating potentials coupled to corresponding electrodes in the devices for differentially modulating the current therethrough.

7. In a timing modulation system, an electron discharge device having a control grid, a cathode and an anode, a regenerative oscillation generating circuit including a tuned tank circuit coupled to the anode of said device, a condenser and an inductance in series coupling the control grid of said device to the tuned tank circuit, a coupling between the cathode and a point on said tank circuit, the arrangement being such that oscillations are generated in said device when operating potentials are supplied to the electrodes, the value of the condenser and inductance being such that their reactances substantially cancel at the frequency of the generated oscillations, an impedance in shunt to said condenser, an impedance in shunt to said inductance, said impedances being of substantially like value, one of said impedances comprising the impedance between the output electrodes of a modulator tube, and means for modulating the current through the tube in accordance with signals.

8. In a timing modulation system an oscillation generator including a tube having an anode, a cathode and a grid, with a tank circuit regeneratively coupled between the grid and the anode and to the cathode, a capacitive reactance and an inductive reactance in series in the coupling between the tank circuit and the grid of said tube, an electron discharge device having input and output electrodes, connections coupling the output electrodes of said device in shunt to said capacitive reactance, and a source of modulating potentials coupled to the input electrodes of said device for modulating the current thereto.

9. In a timing modulation system, an oscillation generator including a tube having an anode, a cathode and a grid with a tank circuit regeneratively coupled between the grid and the anode and to the cathode, a capacitive reactance and an inductive reactance in series in said coupling between the tank circuit and the grid of said tube, an electron discharge device having input and output electrodes, connections coupling the output electrodes of said device in shunt to the inductive reactance, and a source of modulating potentials coupled to the input electrodes of the device for modulating the current therethrough.

10. In a timing modulation system, an oscillation generator including a tube having an anode, a cathode and a grid, with a tank circuit regeneratively coupled between the grid and the anode and to the cathode, reactances of opposite sign in series in said coupling between the tank circuit and the control grid of the tube, an electron discharge device having input and output electrodes, connections coupling the output electrodes of said device in shunt to one of said reactances, a source of modulating potentials coupled to the input electrodes of said device for modulating the current therethrough, an additional tube having output electrodes coupled to the grid and cathode of said first tube and having input electrodes, and means for applying said modulating potentials to the input electrodes of said additional tube.

GEORGE L. USSELMAN.

REFERENCES CITED

The following references are of record in the file of this patent:

UNITED STATES PATENTS

| Number | Name | Date |
|---|---|---|
| 2,160,528 | Usselman | May 30, 1939 |

FOREIGN PATENTS

| Number | Country | Date |
|---|---|---|
| 182,168 | Great Britain | June 21, 1922 |
| 583,524 | France | Oct. 31, 1924 |
| 20,746 | Australia | May 14, 1936 |